United States Patent
Naftalovich et al.

(10) Patent No.: US 9,924,736 B2
(45) Date of Patent: Mar. 27, 2018

(54) USE OF NONDIGESTIBLE NONFIBROUS VOLUMIZER OF MEAL CONTENT AS A METHOD FOR INCREASING FEELING OF SATIETY

(71) Applicants: Rotem Naftalovich, Tenafly, NJ (US); Daniel Naftalovich, Los Angeles, CA (US)

(72) Inventors: Rotem Naftalovich, Tenafly, NJ (US); Daniel Naftalovich, Los Angeles, CA (US)

(*) Notice: Subject to any disclaimer, the term of this patent is extended or adjusted under 35 U.S.C. 154(b) by 556 days.

(21) Appl. No.: 14/140,128

(22) Filed: Dec. 24, 2013

(65) Prior Publication Data

US 2015/0173409 A1    Jun. 25, 2015

(51) Int. Cl.
*A23L 33/25* (2016.01)

(52) U.S. Cl.
CPC .......... *A23L 33/25* (2016.08); *A23V 2200/26* (2013.01); *A23V 2200/332* (2013.01)

(58) Field of Classification Search
CPC .......... A23L 2/52; A23L 1/237; A23L 1/3084; A23K 1/1758; A23K 1/1755; C08F 14/22; C08J 2327/16
USPC .......................................... 426/648; 526/255
See application file for complete search history.

(56) References Cited

U.S. PATENT DOCUMENTS 2,230,654 A    2/1941    Plunkett
4,386,120 A *  5/1983    Sato ..................... A61K 9/1688
                                                     264/DIG. 51

OTHER PUBLICATIONS

"Sodium Polyacrylate". Available online at www.sdbni.com.cn on Dec. 3, 2009.*
Dufour., "How to Make Mud Cookies". Available online at www.dollarsandsense.org on Jul./Aug. 2008.*
"Haiti's poor resort to eating mud as prices rise". Avilable online www.nbcnews.com on Jan. 29, 2008.*
Young et al., "Why on Earth?: Evaluating Hypotheses About the Physiological Functions of Human Geophagy". The Quarterly Review of Biology, vol. 86, No. 2, Jun. 2011.*
"Teflon". Available online at https://toxnet.nlm.nih.gov/cgi-bin/sis/search/a?dbs+hsdb:@term+@DOCNO+833 on 2015.*
Naftalovich R, Naftalovich D, Greenway FL. Polytetrafluoroethylene Ingestion as a Way to Increase Food Volume and Hence Satiety Without Increasing Calorie Content. J Diabetes Sci Technol. Jun. 28, 2016;10(4):971-6.
Haskell experiment: Three-week feeding study in rats with polytetrafluoroethylene resins (Teflon). Microfiche No. 215303.
Haskell experiment: Three-week Feeding study in Rats with Polytetrafluoroethylene Redins (Teflon). Oct. 21, 1968. Medical Research Project No. 1080.
Haskell experiment: Subacute Feeding Study. Nov. 20, 1961. MR No. 604.
Email from David Klonoff from Nov. 23, 2015.
Reviewer Comments to Author.
Email from Grace Crocket from Sep. 14, 2015.
Article titled "PFOA, PTFE, PFOS Can Lead to Thyroid, Heart, Liver and Immune System Disorders", authored by Gloria G. Dahom, PhD, and published by Total Health Magazine.

* cited by examiner

*Primary Examiner* — Erik Kashnikow
*Assistant Examiner* — Assaf Zilbering

(57) ABSTRACT

A method for increasing satiety from food via use of a nondigestible nonfibrous physical volumizer. Distention of the stomach reduces hunger and increases food satiety. The invention increases volume of the mass being ingested without increasing the caloric value of the ingested quantity. This is achieved by use of a volumizing substance that is not metabolized by the body. Polytetrafluoroethylene (PTFE) is one material that could be used as a meal-content volumizing substance.

2 Claims, No Drawings

USE OF NONDIGESTIBLE NONFIBROUS VOLUMIZER OF MEAL CONTENT AS A METHOD FOR INCREASING FEELING OF SATIETY

CROSS REFERENCE TO RELATED APPLICATIONS

Provisional Patent Application No. 61/745,802. Rotem Naftalovich and Daniel Naftalovich. Use of nonmetabolized nonfibrous volumizer of meal content as a method for increasing feeling of satiety. Filing Date: Dec. 25, 2012

BACKGROUND

The present invention is in the fields of public health and food science. More particularly, the present invention has the medical application for treatments for obesity. More particularly, the present invention deals with the physiology of appetite control.

Obesity is a huge problem in the United States. It is an epidemic of increasing prevalence. An effective way to lose weight is to reduce caloric intake. This is often hard for patients to do since it requires a significant lifestyle modification. Artificial sweeteners have been used to decrease caloric intake with minimal lifestyle changes. These compounds work by stimulating the tongue receptors, thereby producing a sweet taste, while at the same time resisting metabolism by the gastrointestinal tract and therefore not contributing to caloric input to the body as natural sweeteners do. For instance, a patient who consumes orally 10 grams of Splenda®, a common artificial sweetener, would later excrete 10 grams of Splenda® in his or her feces, since the artificial sweetener is not metabolized. Other inventions have approached this problem, such as by proposing a liquid colloid of dietary fiber in water suspension that could be drunk for appetite suppression.

Our invention does not use dietary fiber. Dietary fiber is a natural part of certain foods and is generally nondigestible. In the food-service industry "fiber refers to a group of carbohydrates that cannot be absorbed and used by the body." [Wayne Gisslen, Professional Cooking 7th ed, pg 127]. "Digestion is the chemical breakdown of ingested foods into absorbable molecules" [Costanzo, Physiology, 5$^{th}$ ed pg 363]. It is noted in the prior art that a feature of "indigestible substances is they are not digested or absorbed by the digestive tract", however "Indigestible substances, such as dietary fibers . . . exhibit various modes of behavior in the digestive tracts producing . . . physiological effects through the endocrine system of the body" [U.S. Pat. No. 5,358,729]. This means that despite being nondigestible, nondigestible substances can still be utilized for physiological effects.

Physiologically, distention of the stomach by any volume-occupying mass (including food and drinks) leads to the feeling of satiety and reduction in hunger. This gastric distention is caused by volume occupied by the mass ingested and is independent of the caloric value of the mass.

BRIEF SUMMARY OF THE INVENTION

The present invention is the use of nondigestible nonfibrous substance to volumize meal content for the purpose of distending the stomach to reduce hunger. Such a substance can be used as a non-nutritional supplement that will increase the volume of the mass being ingested. By increasing ingested volume, the volumizing substance increases stomach distention, which physiologically reduces hunger and hence diminishes the desire to eat. Overall, this will lead to lower food consumption and caloric intake, and therefore is a useful tool for appetite control and as a treatment for over-eating. In turn, this could contribute to reducing the obesity epidemic. Essentially, the physiology of the stomach and its response to physical distention enables it to be fooled into feeling satisfied by eating fake food which has no caloric value.

A nondigestible volumizing substance can be used with food or drink sources of nutrients to decrease overall consumption. This can be achieved by using the volumizer alongside of a meal (such as within a drink) or directly mixed into the meal being ingested (such as mixed into the meat of a hamburger). For example, a hamburger patty composed of 100 grams of meat can be mixed together with 100 grams of flavor-less plastic powder to produce a larger patty (greater volume) compared to a 100 grams meat-only patty. The volumized patty would be more filling than the 100 grams meat-only patty (due to higher gastric distention) yet equal in caloric and nutritional value (since the nondigestible volumizing substance will not be metabolized and hence not yield caloric value to the body).

Even though artificial sweeteners are not metabolized, they do not have significant effects on stomach distention. Rather, their mechanism is to enhance food flavor by molecular mechanisms while avoiding caloric contribution. They are intended for use in small quantities to enhance flavor, not to distend the stomach. Similarly to how artificial sweeteners emulate sugars to provide flavor without being metabolized, others have tried to emulate fat using nonmetabolized lipid analogues to provide flavor. Unlike artificial sweeteners and lipid analogs, the present invention utilizes a macro-scale effect of the volume of the ingested volumizing substance for hunger reduction via physical distention of the stomach. It involves consumption of much larger amounts and of substances that are designed to occupy volume rather than designed to interact molecularly with taste buds. In fact, an implementation of the present invention may be designed intentionally to be flavor-less. The invention is novel and nonobvious.

BRIEF DESCRIPTION OF THE DRAWINGS

No figures included.

DETAILED DESCRIPTION AND BEST MODE OF IMPLEMENTATION

The present invention claims the use of a nondigestible nonfibrous volumizing substance for ingestion as or within food or drinks, for the purpose of reducing appetite due to gastric distention. A reduction to practice of such a volumizing substance could be a synthetic substance that is safe for human ingestion and would be easily excreted during defecation, since it would not be absorbed and thus persist until the feces. Such a substance could be designed to not detract from the eating experience, such as by being flavor-less and texture-less. Further, the chosen substance would be resistant to acid as to not be degraded by the acidic environment of the gastrointestinal tract. It may also be designed at the appropriate size and in the appropriate shape to not injure the cells of the gastrointestinal tract nor to be taken-up by these cells (e.g. enterocytes). Additionally, the material may be chosen for cost-effectiveness, to enable mass-production and wide incorporation into commercial food products (e.g. fast-food hamburgers, which are important in the obesity epidemic).

Compounds meeting the above requirements exist but are used for commercial applications very different than as nondigestible volumizers for meal content. An example of one such material is polytetrafluoroethylene (PTFE), a synthetic material used in numerous applications, for instance as a non-stick surface in household cookware (e.g. brand-name Teflon®). PTFE is very non-reactive and chemically inert. It is approved by the FDA for use in surgical vascular graft implants. It is heat resistant and can be made into powder form, making it particularly suitable for mixing with raw ground meat during production of hamburgers and other foods. It has a very low friction coefficient so it does not scratch the gastrointestinal tract. It is highly resistant to acid, and indeed one existing application of PTFE is as containers for storage of strong acids. It is relatively cheap, which enables some of its existing applications, such as being used in large-scale roofing construction. Therefore, due to these properties, PTFE can be used to increase a meal's volume significantly without increasing caloric intake. PTFE, or an alternative chosen material, could also be ingested by itself without food or drink to achieve the same satiety effect.

REFERENCES (INCORPORATED HEREIN BY REFERENCE)

U.S. Pat. No. 5,126,332, Ohta; Atsutane (Tokyo, JP), Aoki; Toni (Urawa, JP), Food compositions for the prevention of overeating U.S. Pat. No. 5,286,512, Klemann; Lawrence P. (Somerville, N.J.), Finley; John W. (Whippany, N.J.), Scimone; Anthony (Cedar Grove, N.J.), Diol lipid analogues as edible fat replacements U.S. Pat. No. 5,314,707, Kester; Jeffrey J. (West Chester, Ohio), Elsen; Joseph J. (Cincinnati, Ohio), Wehmeier; Thomas J. (Cincinnati, Ohio), Young; Jerry D. (Cincinnati, Ohio), Polyol fatty acid polyester cooking mediums U.S. Pat. No. 5,358,729, Ohkuma; Kazuhiro (Sanda, JP), Matsuda; Isao (Itami, JP), Nogami; Yoshiki (Kobe, JP), Indigestible dextrin U.S. Pat. No. 5,364,652, Ohkuma; Kazuhiro (Sanda, JP), Hanno; Yoshio (Itami, JP), Inada; Kazuyuki (Takarazuka, JP), Matsuda; Isao (Itami, JP), Katta; Yasuo (Hyogo, JP), Indigestable dextrin U.S. Pat. No. 5,430,141, Ohkuma; Kazuhiro (Sanda, JP), Matsuda; Isao (Itami, JP), Hanno; Yoshio (Itami, JP), Method for preparing low calorie dextrin U.S. Pat. No. 5,472,732, Ohkuma; Kazuhiro (Sanda, JP), Hanno; Yoshio (Itami, JP), Inada; Kazuyuki (Takarazuka, JP), Matsuda; Isao (Itami, JP), Katta; Yasuo (Hyogo, JP), Indigestible dextrin U.S. Pat. No. 5,505,981, Wakabayashi; Shigeru (Takarazuka, JP), Hoshii; Yasuhiro (Fujiidera, JP), Method for imparting ability of preventing obesity and impaired glucose tolerance to foods and foods and sugar preparations exhibiting such preventive effects U.S. Pat. No. 5,536,524, Miller; Mark S. (Arlington Heights, Ill.), Method of making reduced calorie peanut products U.S. Pat. No. 5,662,953, Wheeler; Edward L. (Fairfield, N.J.), D'Amelia; Ronald P. (Hicksville, N.Y.), Leveille; Gilbert A. (Denville, N.J.), Otterburn; Michael S. (Randolph, N.J.), Klemann; Lawrence P. (Somerville, N.J.), Finley; John W. (Whippany, N.J.), Roden; Allan D. (Nobelsville, Ind.), Chrysam; Michael M. (Blairstown, N.J.), Pelloso; Turiddu A. (Carmel, Ind.), Given, Jr.; Peter S. (Glencoe, Ill.), Reduced calorie triglyceride mixtures U.S. Pat. No. 6,162,484, Hammond; Neal A. (Baton Rouge, La.), Method for the production of a reduced calorie honey composition U.S. Pat. No. 6,210,702, Samman; Ratib Al (Damascus, SA), Weight loss composition and method for losing weight U.S. Pat. No. 6,248,390, Stillman; Suzanne Jaffe (Los Angeles, Calif.), Water containing soluble fiber U.S. Pat. No. 6,419,977, Born; Terri Alice (Shakopee, Minn.), Nutritional meat extender compositions U.S. Pat. No. 6,797,290, Dartey; Clemence (Ambler, Pa.), Leveille; Gilbert (Denville, N.J.), Sox; Thomas E. (Ambler, Pa.), Compositions for appetite control and related methods U.S. Pat. No. 7,138,154, Brendel; Raymond (Bethune, FR), Boursier; Bernard (Violaines, FR), Leroux; Patrick (Estaires, FR), Process for preparing a low-calorie food U.S. Pat. No. 7,608,245, Lin; Henry C. (Manhattan Beach, Calif.), Methods for manipulating satiety

We claim:

1. A method of human consumption of food, the method comprising consuming a meal, the meal comprising polytetrafluoroethylene (PTFE) wherein the weight ratio of PTFE to food is 1:1.

2. The method of claim 1 wherein satiation occurs.

* * * * *